United States Patent
McIntosh et al.

(10) Patent No.: US 7,066,458 B2
(45) Date of Patent: Jun. 27, 2006

(54) POWERED CLAMP ASSEMBLY

(75) Inventors: Bruce D. McIntosh, Monroeville, IN (US); Kenneth A. Steele, Fort Wayne, IN (US); William D. Givens, Berne, IN (US)

(73) Assignee: PHD, Inc., Fort Wayne, IN (US)

( * ) Notice: Subject to any disclaimer, the term of this patent is extended or adjusted under 35 U.S.C. 154(b) by 112 days.

(21) Appl. No.: 10/637,400

(22) Filed: Aug. 8, 2003

(65) Prior Publication Data

US 2004/0113343 A1    Jun. 17, 2004

Related U.S. Application Data

(60) Provisional application No. 60/403,136, filed on Aug. 13, 2002.

(51) Int. Cl.
*B23Q 3/08* (2006.01)
(52) U.S. Cl. ............................ 269/34; 269/32; 269/228
(58) Field of Classification Search ................. 269/34, 269/32, 20, 24–27, 228
See application file for complete search history.

(56) References Cited

U.S. PATENT DOCUMENTS

| | | | |
|---|---|---|---|
| 3,772,907 A | 11/1973 | Rider | |
| 3,972,218 A | 8/1976 | Pawloski | |
| 4,211,123 A * | 7/1980 | Mack | 74/99 A |
| 4,463,635 A | 8/1984 | Hafla et al. | |
| 4,546,681 A | 10/1985 | Owsen | |
| 4,571,975 A | 2/1986 | Pawloski et al. | |
| 4,845,834 A | 7/1989 | Watson | |
| 4,877,228 A * | 10/1989 | Ripert | 269/156 |
| 4,949,961 A | 8/1990 | Milano | |
| 5,481,951 A | 1/1996 | Kiefer | |
| 5,669,653 A | 9/1997 | Penisson | |
| 5,671,961 A | 9/1997 | Buck | |
| 6,116,118 A | 9/2000 | Wesch, Jr. | |
| 6,588,816 B1 * | 7/2003 | Moilanen et al. | 294/88 |

OTHER PUBLICATIONS

SMC W-RF Series Frame Clamp Catalog, 6 pages, SMC, 2990 Technology Drive, Rochester Hills, MI 48309. Aug. 21, 1998.
SMC W-RF Clamp CAD Drawings (3), Nov. 10, 2005.

* cited by examiner

*Primary Examiner*—Lee D. Wilson
(74) *Attorney, Agent, or Firm*—Barnes & Thornburg LLP

(57) ABSTRACT

A powered clamp assembly is provided having an actuator, a cam member, a jaw arm, and a bearing member. The cam member has a camming surface and is driven by the actuator. The jaw arm is pivotable about an axis. The bearing member is attached to the jaw arm, as well as being engagable with the camming surface of the cam member. Movement of the cam member causes the camming surface to engage the bearing member which causes the jaw arm to pivot.

22 Claims, 9 Drawing Sheets

POWERED CLAMP ASSEMBLY

RELATED APPLICATIONS

The present application is related to and claims priority to U.S. Provisional Patent Application Serial No. 60/403,136, filed on Aug. 13, 2002, entitled Frame Clamp. The subject matter disclosed in that provisional patent application is hereby expressly incorporated into the present application.

TECHNICAL FIELD

The present disclosure relates to powered clamps, and more particularly to high strength, cam driven clamp assemblies for holding structures.

BACKGROUND AND SUMMARY

Cam driven clamp or gripper assemblies are known. Such clamps typically include jaw arms with cam slots disposed therein. A bushing or similar bearing member is attached to an actuator for linearly reciprocal movement. The bushing is also located in the cam slot. When the actuator moves the bushing, it follows the path of the cam slot, thereby translating linear motion into pivoting or rotational motion to open or close the jaw arms.

It would be beneficial to provide a powered clamp assembly for high strength applications, in contrast to prior clamp designs.

Accordingly, an illustrative embodiment of a powered clamp assembly of the present invention is provided herein. The clamp assembly illustratively comprises an actuator, a cam member, at least one jaw arm, and a bearing member. The cam member has a camming surface and is driven by the actuator. The at least one jaw arm is pivotable about an axis. The bearing member is attached to the jaw arm, as well as being engagable with the camming surface of the cam member. Movement of the cam member causes the camming surface to engage the bearing member, causing the jaw arm to pivot.

In the above and other illustrative embodiments, the powered clamp assembly may also provide: the cam member being moveable linearly; the camming surface being arcuate to cause the jaw arm to pivot; a link that moveably couples the jaw arm to a cam member; an actuator being a pneumatic actuator; a camming surface of the cam member being located on its periphery; a cam member being moveable in first and second directions wherein the camming surface of the cam member moves the jaw arm in a third direction when the cam member is moved in a first direction; a link that moves the jaw arm in a fourth direction when the cam member is moved in a first direction; the cam member being movable in first and second linearly reciprocal directions; a bearing member being a bushing that follows an arcuate cam path that displaces the bushing to cause the jaw arm to pivot; a link comprising a slot; and the jaw arm comprising a pin extending therefrom that is disposed in a slot to prevent interference between a link and the cam member when the cam member is moved in the first direction, and provide engagement between the link and the cam member when the cam member is moved in the second direction.

Another illustrative embodiment of the present invention provides a powered clamp assembly which comprises a body, an actuator, a cam member, first and second jaw arms, and first and second bearing members. The cam member has a first camming surface and a second camming surface, and is driven by the actuator. The first jaw arm is pivotally mounted with respect to the body. The second jaw arm is also pivotally mounted with respect to the body, and is positioned opposite the first jaw arm. The first bearing member is attached to the first jaw arm and is engagable with the first bearing surface of the cam member. The second bearing member is attached to the second jaw arm and is engagable with the second bearing surface of the cam member. In addition, movement of the cam member causes the first and second camming surfaces to engage the first and second bearing members, respectively, to cause the first and second bearing members to move to cause the first and second jaw arms also to move.

In the above and other illustrative embodiments, the powered clamp assembly may further provide: a first link that moveably couples the first jaw arm to the cam member; a second link that moveably couples the second jaw arm to the cam member; the cam member being moveable in a first direction; first and second camming surfaces of the cam member engage the first and second bearing members, respectively, to move the first and second jaw arms, respectively, to a closed position; the cam member being moveable in a second direction wherein first and second links move the first and second jaw arms to an open position; first and second bearing members being first and second bushings, respectively, each following arcuate cam paths of the first and second camming surfaces, respectively, such that the first and second bushings are displaced to cause the first and second jaw arms to pivot; first and second links each comprising a slot; first and second jaw arms each comprising a pin extending therefrom, respectively, wherein the pin extending from the first jaw arm is disposed in the slot of the first link, and wherein the pin extending from the second jaw arm is disposed in the slot of the second link so as to prevent interference between the first and second links and the cam member when the cam member is moved in the first direction, and provide engagement between the first and second links and the cam member when the cam member is moved in the second direction; and the cam member serving as a wedge between the first and second bearing members moving the same apart, preventing a change in position until the cam member is moved.

Another illustrative embodiment of the present invention provides a powered clamp assembly which comprises an actuator, a cam member, a link, a jaw arm, and a bearing member. The cam member has a camming surface disposed thereon and is driven by the actuator in first and second directions. The link is moveably coupled to the cam member and to the jaw arm. The bearing member is also coupled to the jaw arm. During movement of the cam member in the first direction, the camming surface engages the bearing to move the jaw arm.

In the above and other illustrative embodiments, the powered clamp assembly may further provide: during movement of the cam member in a second direction, a link engages a pin to move the jaw arm; and engagement of a bearing member by the cam member to move the arm only occurs during movement of the cam member in a first direction.

Another illustrative embodiment of the present invention provides a powered clamp assembly which has at least two jaw arms and an actuator. One of the jaw arms is pivotable with respect to the other at a pivot point. The powered clamp assembly further comprises a wedge that is coupled to the actuator for movement in first and second directions. In addition, the wedge engages the jaw arms at a location spaced apart from the pivot point to move at least one of the jaw arms about the pivot point.

Additional features and advantages of the powered clamp assembly will become apparent to those skilled in the art upon consideration of the following detailed description of the illustrated embodiment exemplifying the best mode of carrying out the powered clamp assembly as presently perceived.

BRIEF DESCRIPTION OF DRAWINGS

The present disclosure will be described hereafter with reference to the attached drawings which are given as non-limiting examples only, in which.

Corresponding reference characters indicate corresponding parts throughout the several views. The exemplification set out herein illustrates embodiments of the powered clamp assembly, and such exemplification is not to be construed as limiting the scope of the powered clamps in any manner.

DETAILED DESCRIPTION

Figure 1:
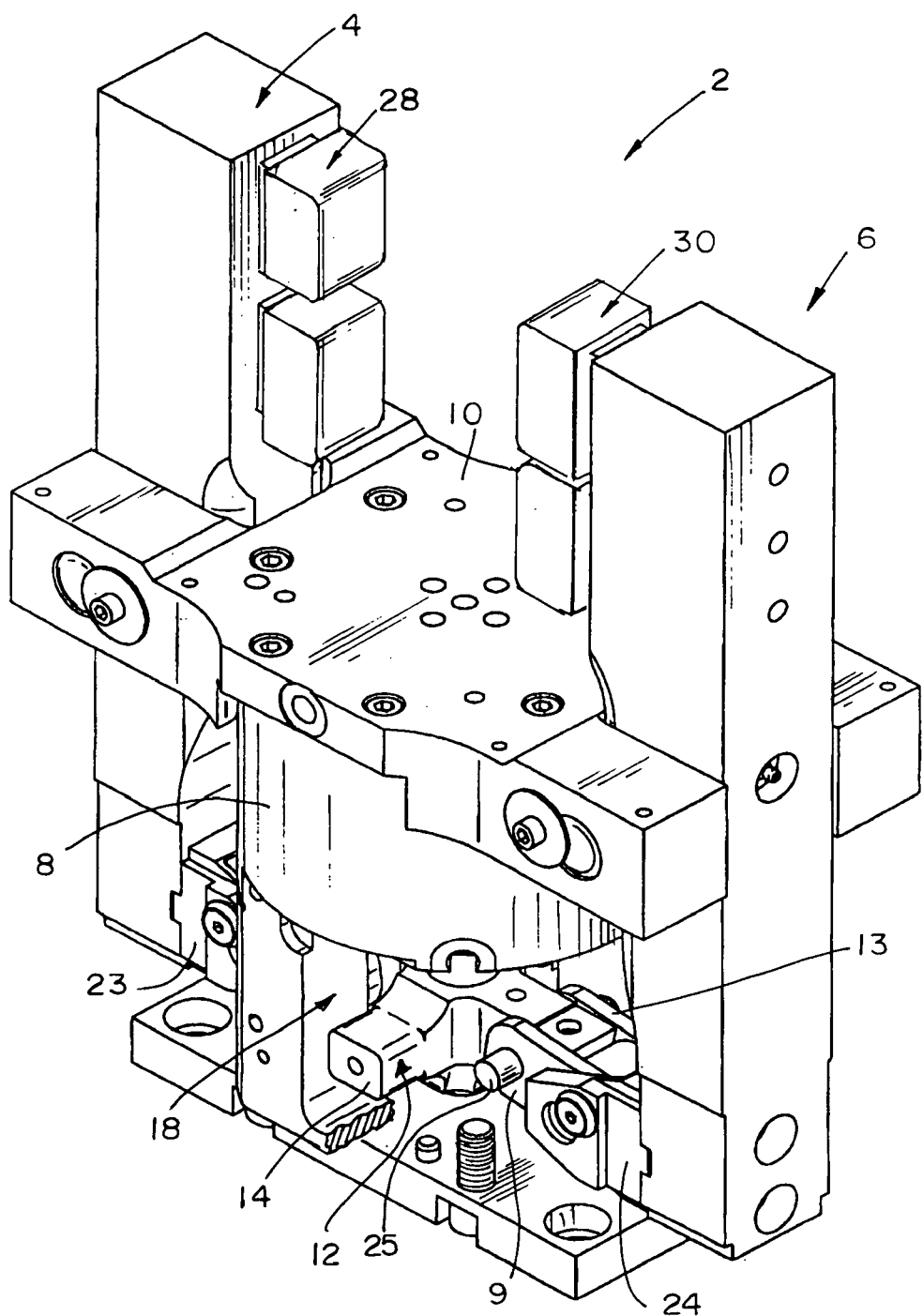
FIG. 1 is a perspective view of an illustrative embodiment of a powered clamp assembly.

A perspective view of an illustrative embodiment of a powered clamp assembly 2 is shown in FIG. 1. Powered clamp assembly 2 illustratively comprises opposed jaw arms 4 and 6 separated by a body 8. A pivot block 10 is located on body 8 for receiving the fulcrum of jaw arms 4 and 6. A cam member 12 has cross bearings 14 and 16 that are received in slots 18 and 20, respectively, which are disposed through a portion of body 8. (See, also, FIG. 3.) Cam member 12 is also coupled to jaw arms 4 and 6 via links 7, 9, 11, and 13. (See, also, FIG. 3.) Links 7, 9, 11, and 13 are pivotally attached to cam member 12 illustratively via dowel pins 22 and 25, respectively. (See, also, FIG. 3.) Links 7, 9, 11, and 13 are also pivotally attached to clevis brackets 23 and 24, respectively. Clevis brackets 23 and 24 are attached to either jaw arms 4 or 6 as illustratively shown.

Figure 2:
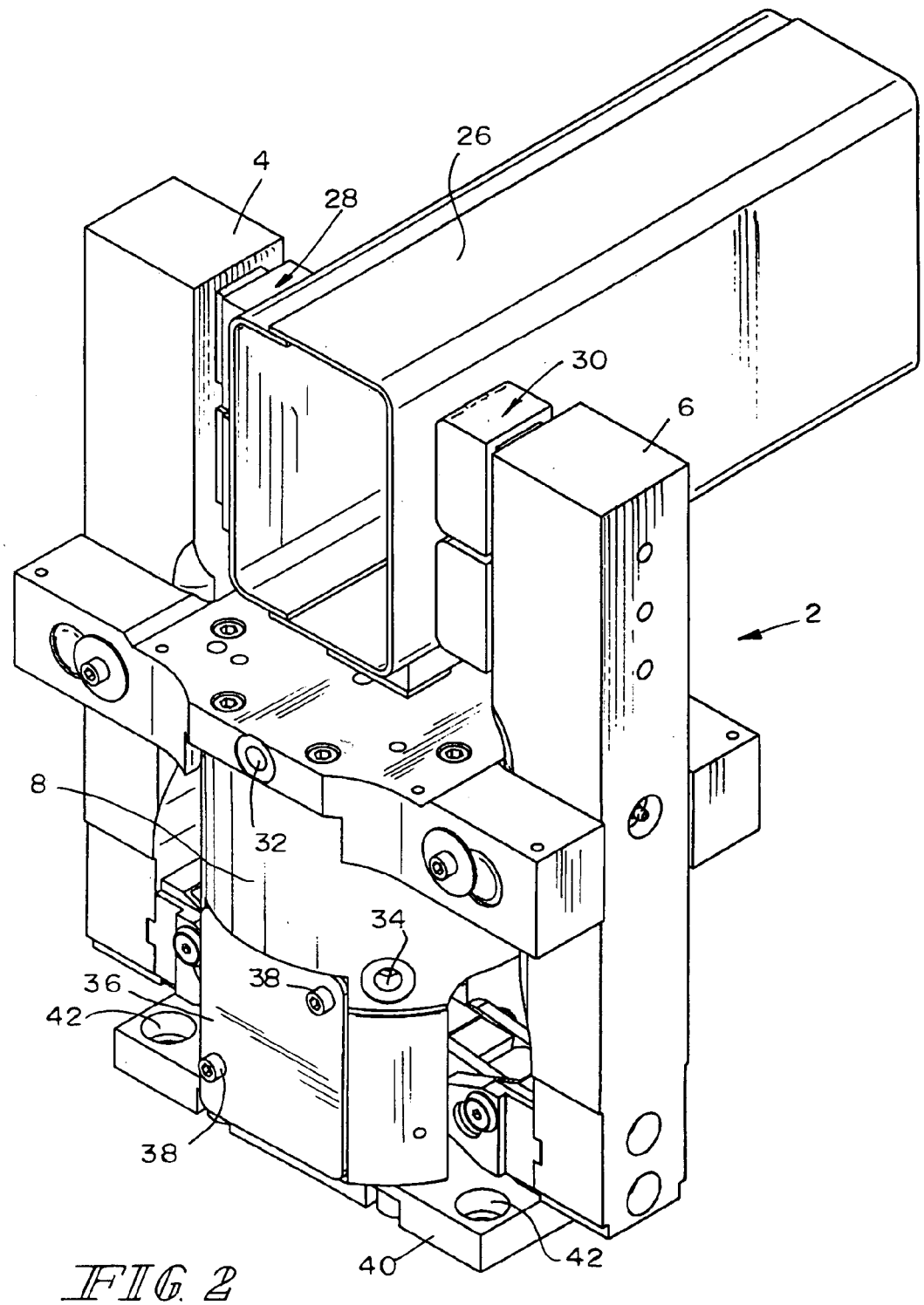
FIG. 2 is a perspective view of the powered clamp assembly of FIG. 1 shown in the clamped position, clamping a work piece frame.

Another perspective view of powered clamp assembly 2 is shown in FIG. 2. This view shows clamp assembly 2 clamping onto a work piece frame 26 with jaw tips 28 and 30 attached to jaw arms 4 and 6, respectively, as shown. Also shown in this view are ports 32 and 34, which provide fluid to actuate clamp assembly 2. It is appreciated that clamp assembly 2 may be driven my pneumatic, hydraulic or electrical means, for example.

Further shown in this view is an illustrative cover plate 36 which fastens onto body 8 via fasteners 38. Cover plate 36 protects slot 18 and cross bearing 14 from debris and contaminates. (See, also, FIGS. 1 and 3.) Assembly 2 is attached to a mounting plate 40 which can illustratively serve as a stop for cam member 12, as well as an attachment point for mounting onto a manufacturing line, etc. Bores 42 are provided as an illustrative means for such attachment.

Figure 3:
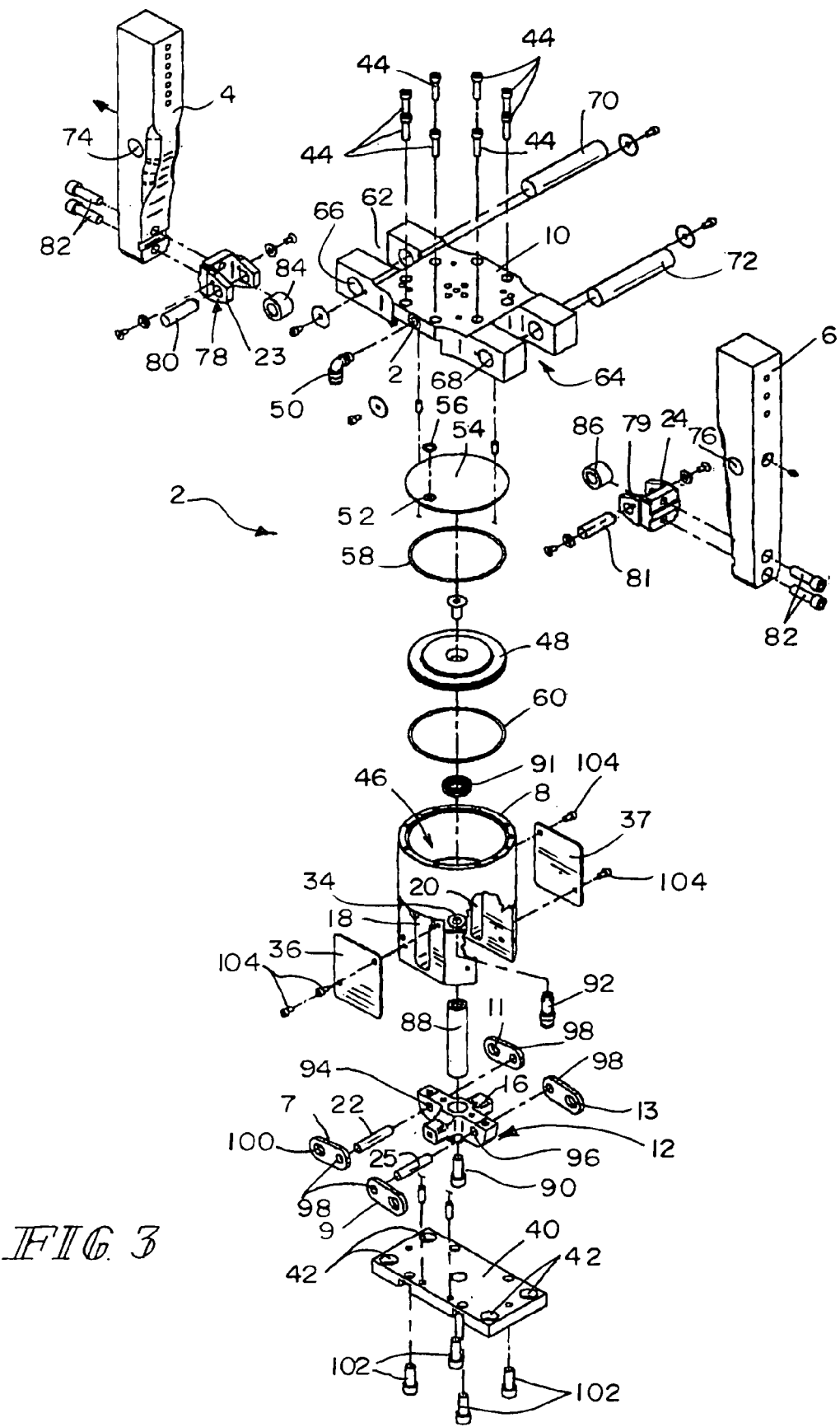
FIG. 3 is an exploded view of a powered clamp assembly.

An exploded view of assembly 2 is shown in FIG. 3. This view shows how the components of assembly 2 relate to each other. For example, pivot block 10 is attached to body 8 via bolts or fasteners 44. Pivot block 10 caps cylinder 46 which receives piston 48 for driving cam member 12. Illustratively, a port fitting 50 is attached to port 32, itself in communication with cap 54, specifically hole 52, to provide communication between fitting 50 and cylinder 46 to provide fluid, illustratively air, therein. A manifold seal 56 is located about the periphery of hole 52 to maintain a seal between the underside of pivot block 10 and cap 54. Seals 58 and 60 are provided about the periphery of piston 48 and cap 54 to prevent leakage of fluid therefrom.

Pivot block 10 also includes slots 62 and 64, each configured to receive jaw arms 4 and 6, respectively. Bores 66 and 68 are disposed through block 10 on each side of slots 62 and 64 as illustratively shown in FIG. 3. Each of bores 66 and 68 receive a pivot pin 70 and 72, respectively. These pins 70 and 72 each extend through bore 74 and 76, respectively, of each jaw arms 4 and 6, respectively. Accordingly, jaw arms 4 and 6 are each pivotally attached to pivot block 10.

Attached to jaw arms 4 and 6, respectively, are clevis brackets 23 and 24, respectively. The clevis brackets 23 and 24 are illustratively U-shaped brackets having bores 78 and 79 disposed therethrough, as shown in FIG. 3, to receive bearing pins 80 and 81, respectively. Clevis brackets 23 and 24 are illustratively attached to jaw arms 4 and 6, respectively, via fasteners 82, that bore through the jaw arm's body and fasten into the brackets. Disposed on bearing pins 80 and 81 are, illustratively, roller bearings 84 and 86, respectively.

Extending from body 8 is a piston rod 88 that is attached to cam member 12, as well as disposed, at least partially, in cylinder 46. Within cylinder 46, a rod seal 91 is located about the periphery of rod 88, preventing fluid from escaping therefrom. Rod 88 is attached to cam member 12 via fastener 90. A port fitting 92 is coupled with port 34, having communication therewith, as well as cylinder 46, for providing fluid to the cylinder 46 below piston 48.

Links 7, 9, 11, and 13 are each pivotally attached to cam member 12. In the illustrated embodiment, pins 22 and 25 are each disposed through bores 94 and 96, respectively, of cam member 12. Each of the links 7, 9, 11, and 13 have a hole 98 disposed therethrough that receives either pin 22 or 25 (see FIG. 3) for pivotable attachment thereto. Each of the links 7, 9, 11, and 13 also have an illustrative slot 100 disposed therethrough to receive a portion of either bearing pin 80 or 81, thereby also pivotally attaching the links to either clevis brackets 23 or 24 (see FIG. 3). This allows a moveable connection between cam member 12 and the jaw arms 4 and 6. It is appreciated that the hole 98 could be slotted in place of slot 100.

FIG. 3 also shows a bracket having a plurality of mounting bores 42 to accommodate any variety of desired mounting schemes. Fasteners 102 are disposable through plate 40 for attachment to body 8. Also shown in FIG. 3 are cover plates 36 and 37 that attach to body 8 via fasteners 104 to mitigate contamination of slots 18 and 20, respectively.

Figure 4:
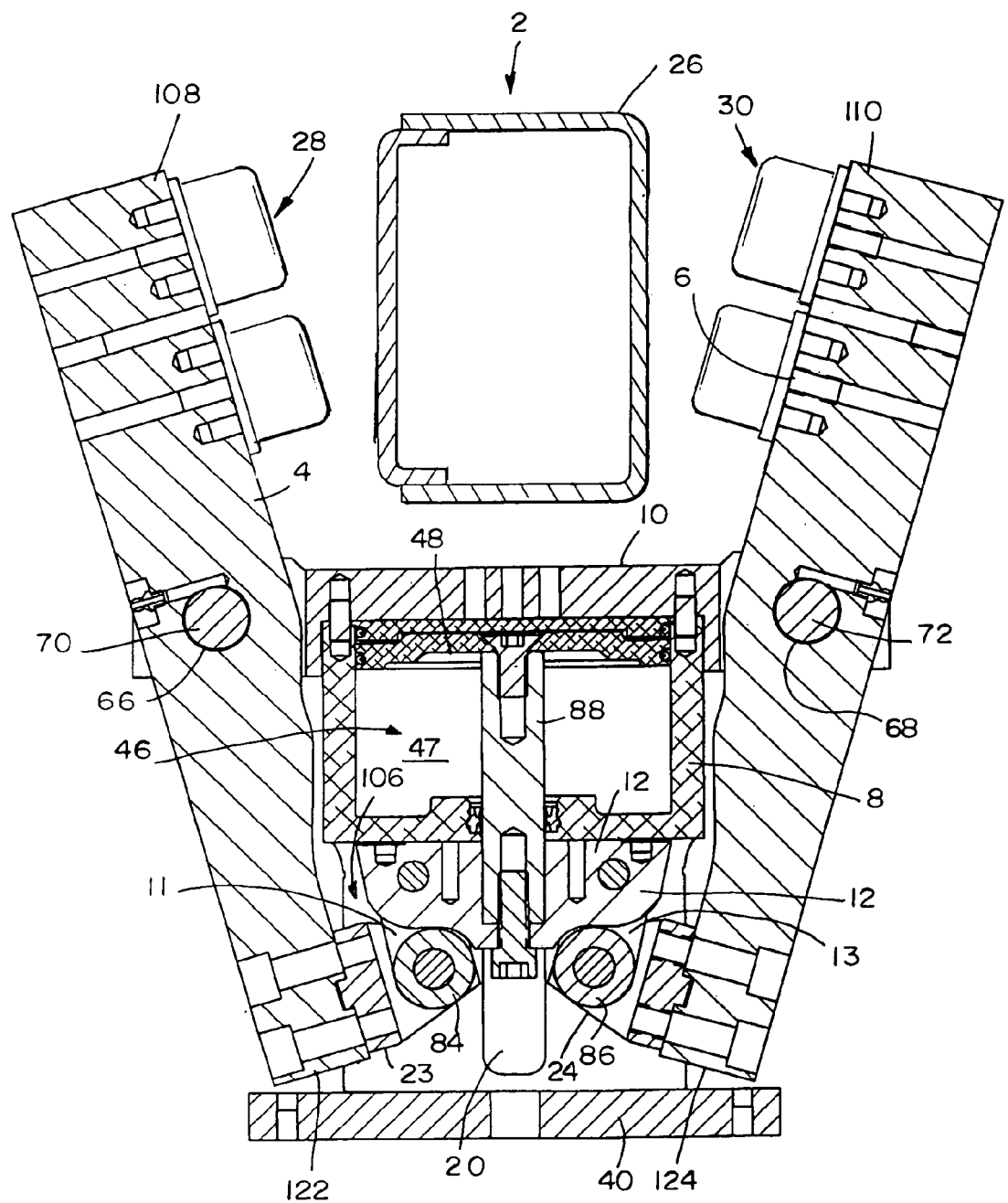
FIG. 4 is a cross-sectional view of an illustrative embodiment of a powered clamp assembly, shown in the open position.

A side cross-sectional view of powered clamp assembly 2 is shown in FIG. 4. In this illustrative embodiment, the jaw arms 4 and 6 are located in their full open position. Illustratively, the cylinder 46 is filled with fluid in cylinder portion 47 below piston 48, which retracts piston rod 88 within cylinder 46. This results in cam member 12 being located in the fully retracted position, illustratively adjacent the lower surface 106 of body 8. In this position, links 11 and 13, being pivotable, are allowed to drop which causes the roller bearings 84 and 86 to illustratively be located below cam member 12, and in a relatively close proximity to each other. Because clevis brackets 23 and 24 are attached to roller bearings 84 and 86, respectively, and to jaw arms 4 and 6, respectively, said jaw arms, at proximal ends 122 and 124, respectively, are caused to be drawn inwardly towards cam member 12. Because jaw arms 4 and 6 are drawn inwardly, distal ends 108 and 110, respectively, are caused to be separated. This separation is clamp assembly 2 in the open position.

Figure 5:
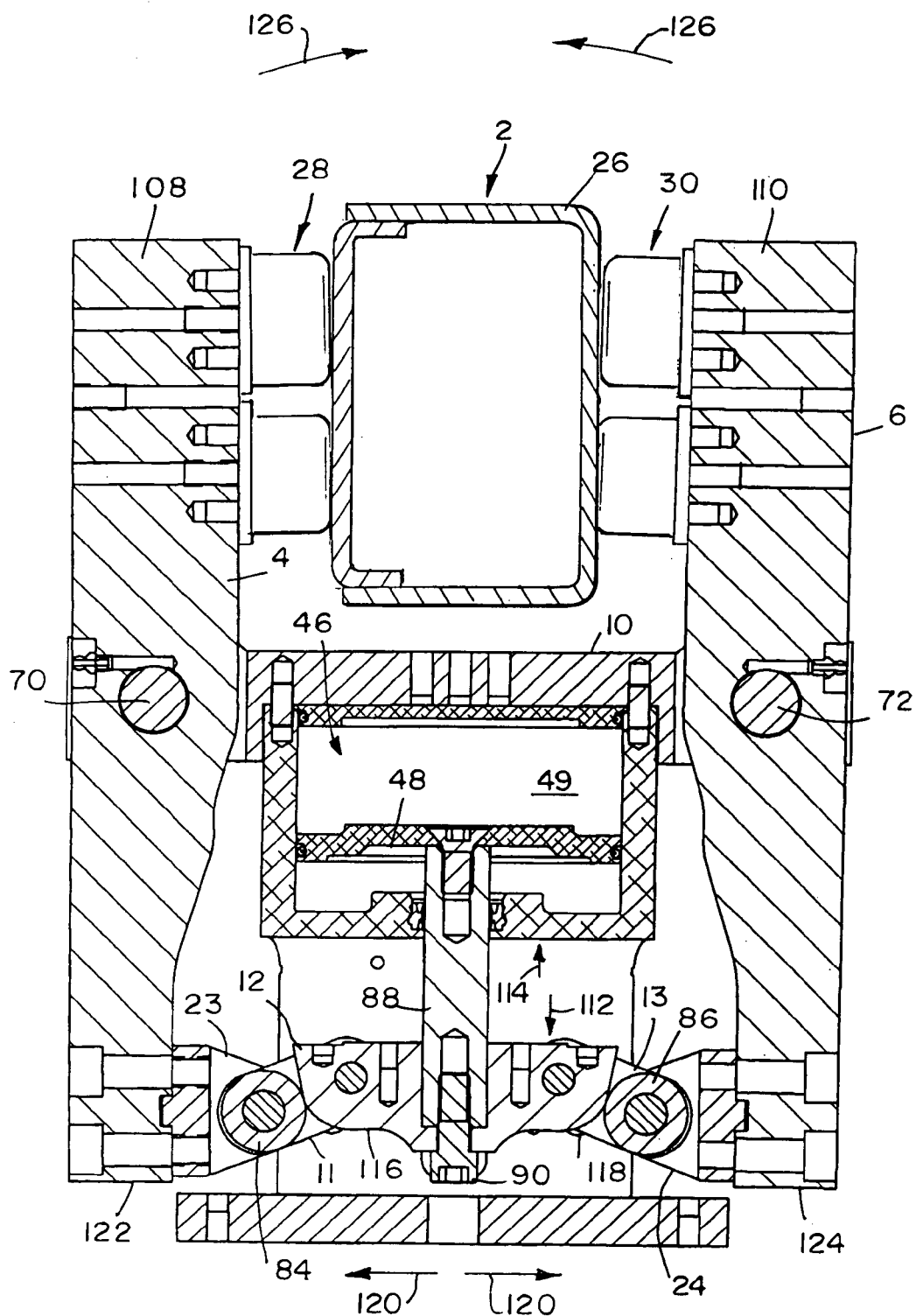
FIG. 5 is another cross-sectional view of the powered clamp assembly of FIG. 4, shown in the partially closed position.

Another cross-sectional view of powered clamp assembly 2 is shown in FIG. 5. In this view, illustratively, fluid from port 32 is depositing into cylinder portion 49 above piston 48, driving piston rod 88 outward from cylinder 46 in direction 112. Cam member 12 comprises camming surfaces 116 and 118 on each side of cam member 12, as illustratively shown in FIG. 5. Cam member 12, itself, along with the contour of the camming surfaces 116 and 118, engage and drive roller bearings 84 and 86 in diverging directions indicated by reference numeral 120. The outward contour slope of camming surfaces 116 and 118 continue to drive roller bearings 84 and 86, causing the proximal ends 122 and 124, and the distal ends 108 and 110 to move as well. Because of the pivoting attachment of pivot pins 70 and 72 on jaw arms 4 and 6, respectively, as the proximal ends 122 and 124 are caused to move in diverging directions 120, the distal ends 108 and 110 are caused to move in converging directions 126. In other words, as the camming surfaces 116 and 118 separate the proximal ends 122 and 124 farther apart, the distal ends 108 and 110 move closer together. This is the mechanism by which the jaw arms 4 and 6 grip the work piece frame 26.

Figure 6:
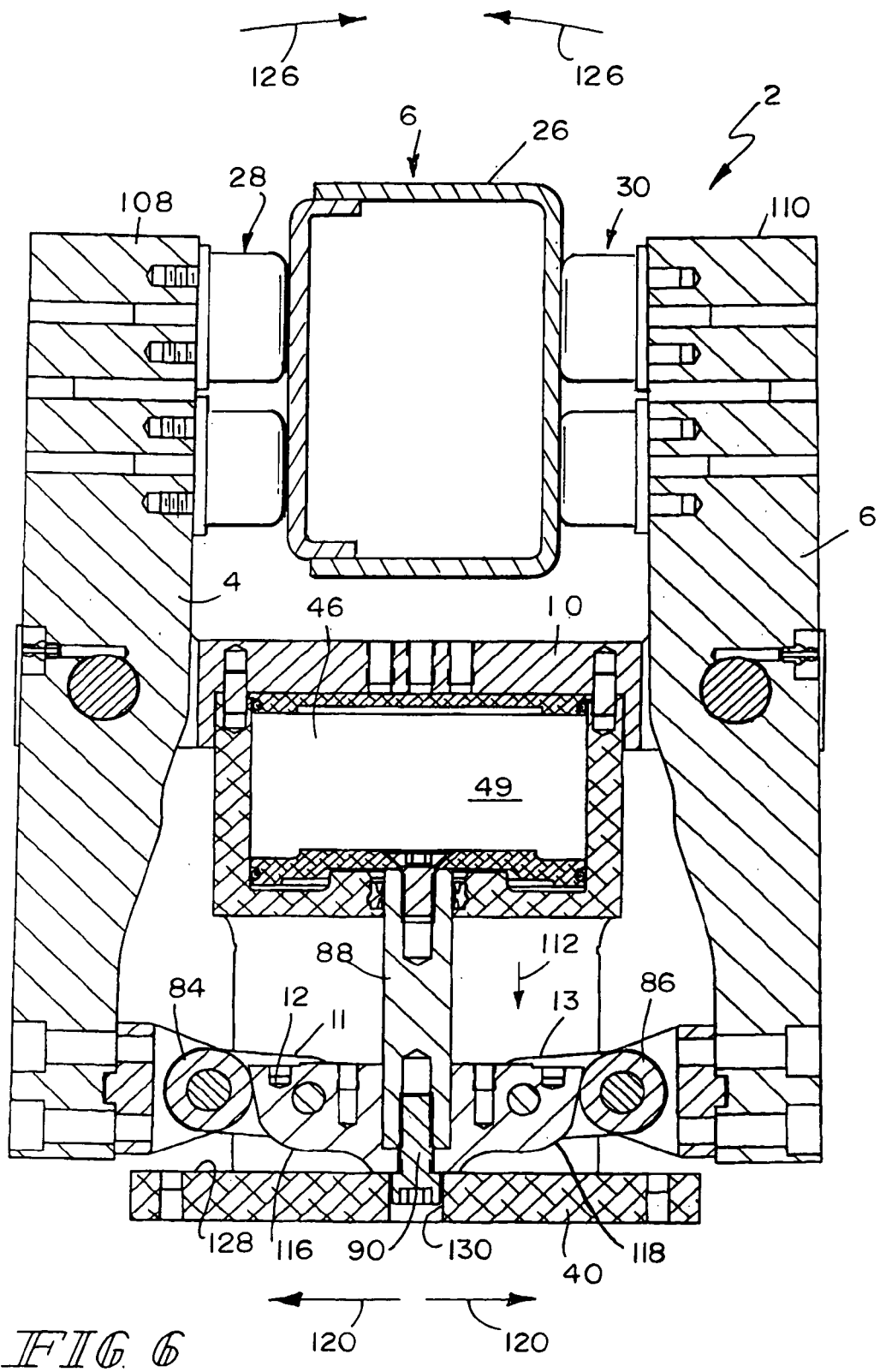
FIG. 6 is another cross-sectional view of the powered clamp assembly of FIG. 4, shown in the filly closed position.

Another cross-sectional view of powered clamp assembly 2 is shown in FIG. 6. In this view, jaw arms 4 and 6 are located in the fully closed position. In this illustrative embodiment, piston rod 88 is fully extended from cylinder 46. In addition, the camming surfaces 116 and 118 of cam member 12 have fully separated roller bearings 84 and 86. This causes distal ends 108 and 110 of jaw arms 4 and 6, respectively, to move in converging directions 126. In this embodiment, cam member 12 may also serve as a wedge to provide a continual closing force on distal ends 108 and 110. This is to prevent the jaw arms from pre-maturely opening and releasing the work piece. It is appreciated that the wedging action of cam member 12 will be influenced by how or to what degree jaw arms 4 and 6 have to close to grip a work piece. It is also appreciated that the fully closed position shown in FIG. 6 is for illustrative purposes. In this illustrated embodiment, the top surface 128 of plate 40 can serve as a stop, thereby limiting travel in direction 112 of piston rod 88, and, consequently, cam member 12. In the illustrative embodiment, a bore 130 is disposed through or within plate 40 so as to receive fastener 90 that attaches cam member 12 to piston rod 88.

Body 8 also includes slots 18 and 20. (See FIGS. 1, 3, and 4.) Cross-bearings 14 and 16 extend from cam member 12 transversely from camming surfaces 116 and 118. (See FIGS. 1 and 3.) Cross bearings 14 and 16 also have bearing surfaces and are located in slots 18 and 20, respectively. As piston rod 88 and cam member 12 are reciprocally moved in directions 112 and 114, cross bearings 14 and 16 move within corresponding slots 18 and 20. This interaction assists in keeping cam member 12 centered with respect to the piston rod 88. Furthermore, the cross bearings keep unbalanced forces, that might be created by one jaw arm acting on the work piece prior to the other jaw arm, from damaging the cam member 12.

Figure 7:
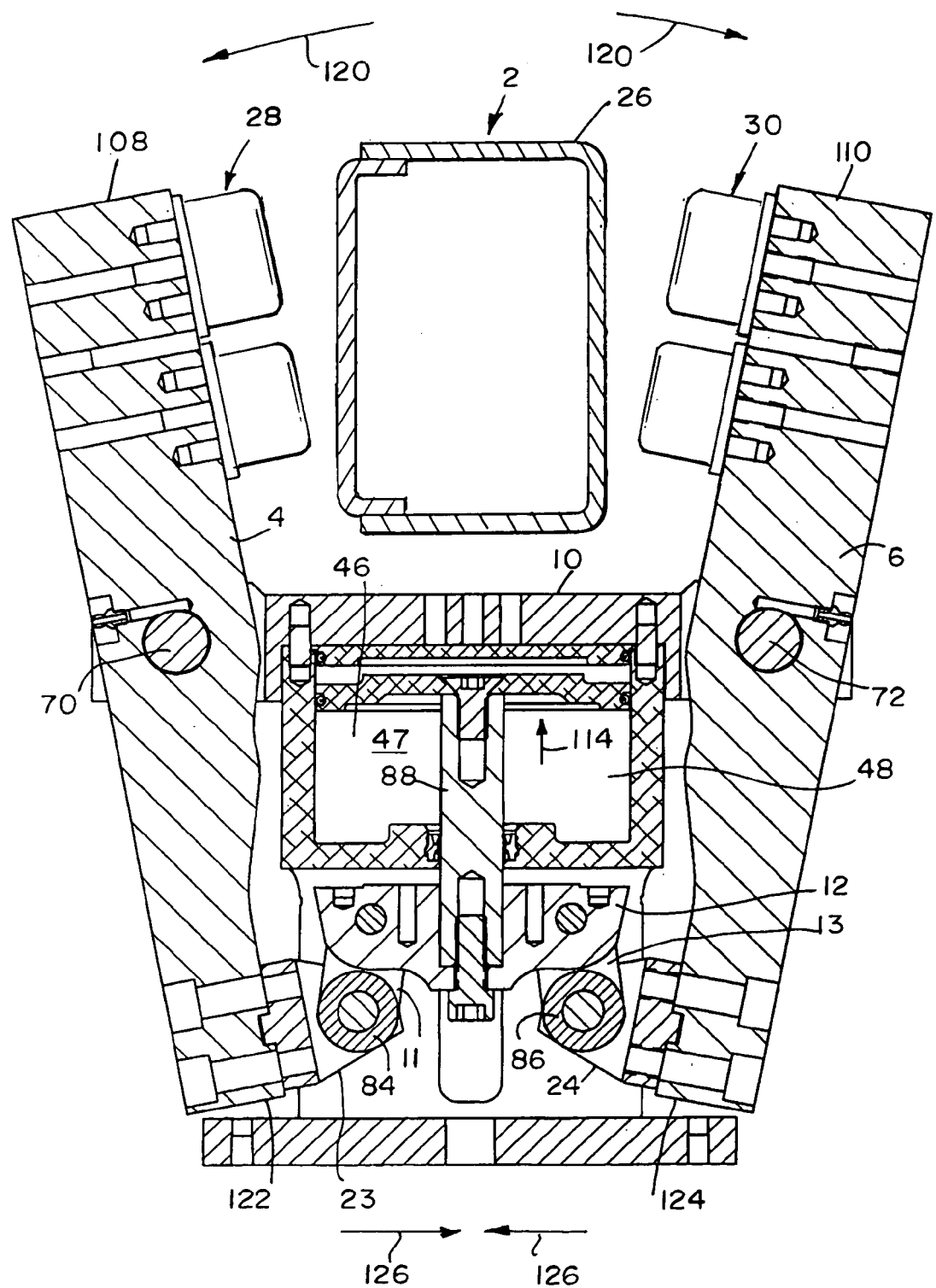
FIG. 7 is another cross-sectional view of the powered clamp assembly of FIG. 4, shown in the partially opened position.

Another cross-sectional view of powered clamp assembly 2 is shown in FIG. 7. In this view, fluid is caused to fill cylinder portion 47 of cylinder 46 below piston 48, causing piston rod 88 to move or retract in direction 114 and into cylinder 46. This causes cam member 12 to begin pulling on links 11 and 13. As cam member 12 is drawn up in direction 114, links 11 and 13, attached thereto as well as being attached to clevis brackets 23 and 24. This causes the proximal ends 122 and 124 to move in convergent directions 126. As a consequence, distal ends 108 and 110 of jaw arms 4 and 6 move in divergent directions 120, thereby opening the jaw arms 4 and 6. In this illustrative embodiment, the length of the links and their attachment to both the jaw arms and the cam members contribute in drawing the proximal ends of the jaw arms together, thereby opening the clamp.

Figure 8:
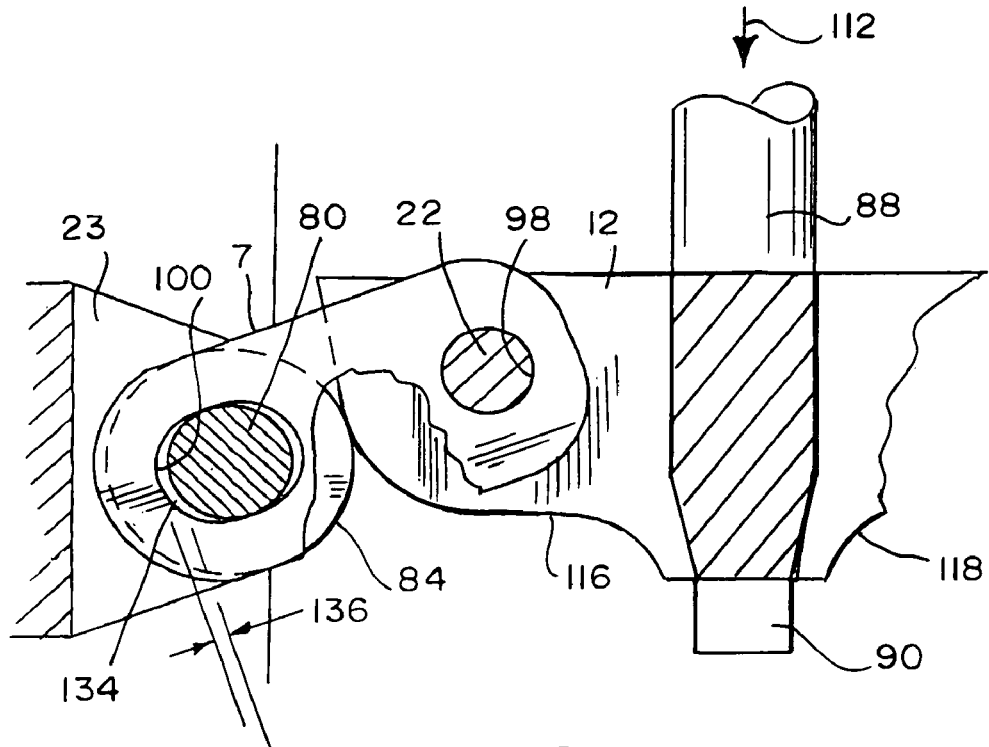
FIG. 8 is a detail view of a linkage assembly of FIG. 10.

As illustratively shown in the detail view of FIG. 8, link 7 comprises slot 100. In this view, camming surface 116 engages roller bearing 84 while cam member 12 moves in direction 112 to close distal ends 108 and 110 of jaw arms 4 and 6, respectively. (See FIG. 10.) Link 7 does not interfere with this engagement because bearing pin 80 does not contact end 134 of slot 100. The distance 136 between end 134 and pin 80 exists so roller bearing 84 can engage camming surface 116. It is appreciated that the same occurs with the other links 9, 11 and 13 with their corresponding structures.

Figure 9:
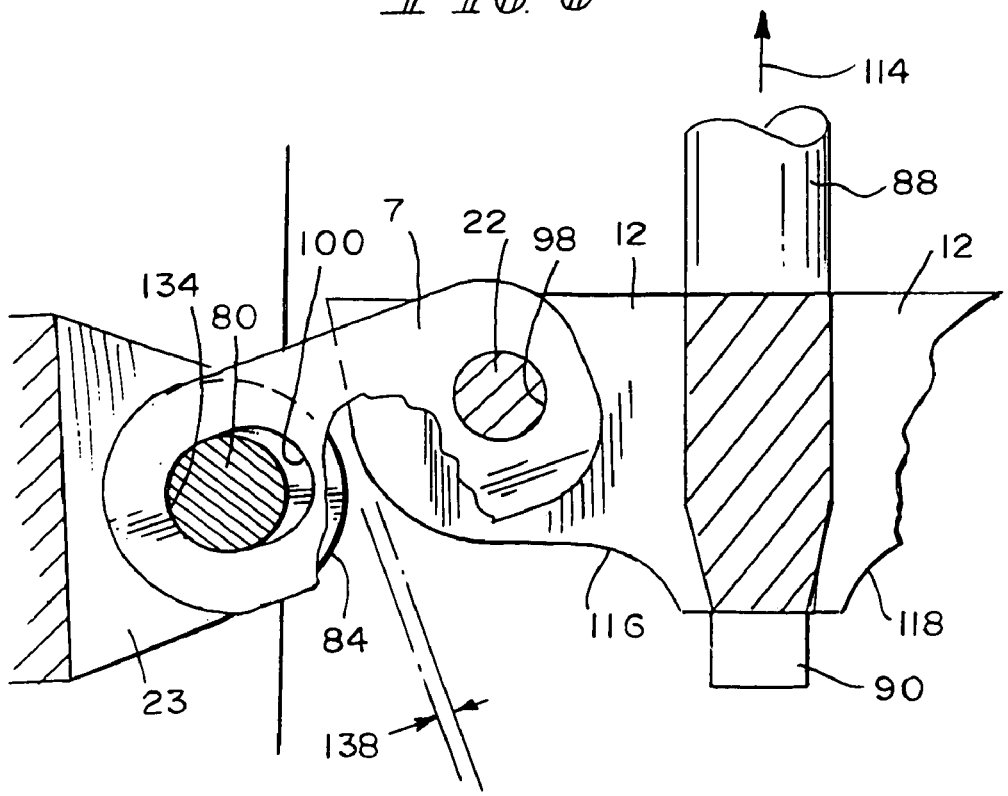
FIG. 9 is another detail view of the linkage of FIG. 8, but with a bearing member separated from a camming path.

In contrast, as shown in FIG. 9, camming surface 116 does not engage roller bearing 84 while cam member 12 moves in direction 114 to open distal ends 108 and 110 of jaw arms 4 and 6. (See FIG. 10.) Rather, bearing pin 80 contacts end 134 and is carried by slot 100 as cam member 12 moves in direction 114. Space 138 illustratively exists because there is no engagement between roller bearing 84 and camming surface 116. The cam member 12 will simply pull the proximal ends 122 and 124 of the jaw arms 4 and 6, respectively, inward and upward. It is appreciated that the same occurs with the other links 9, 11 and 13 with their corresponding structures.

Figure 10:
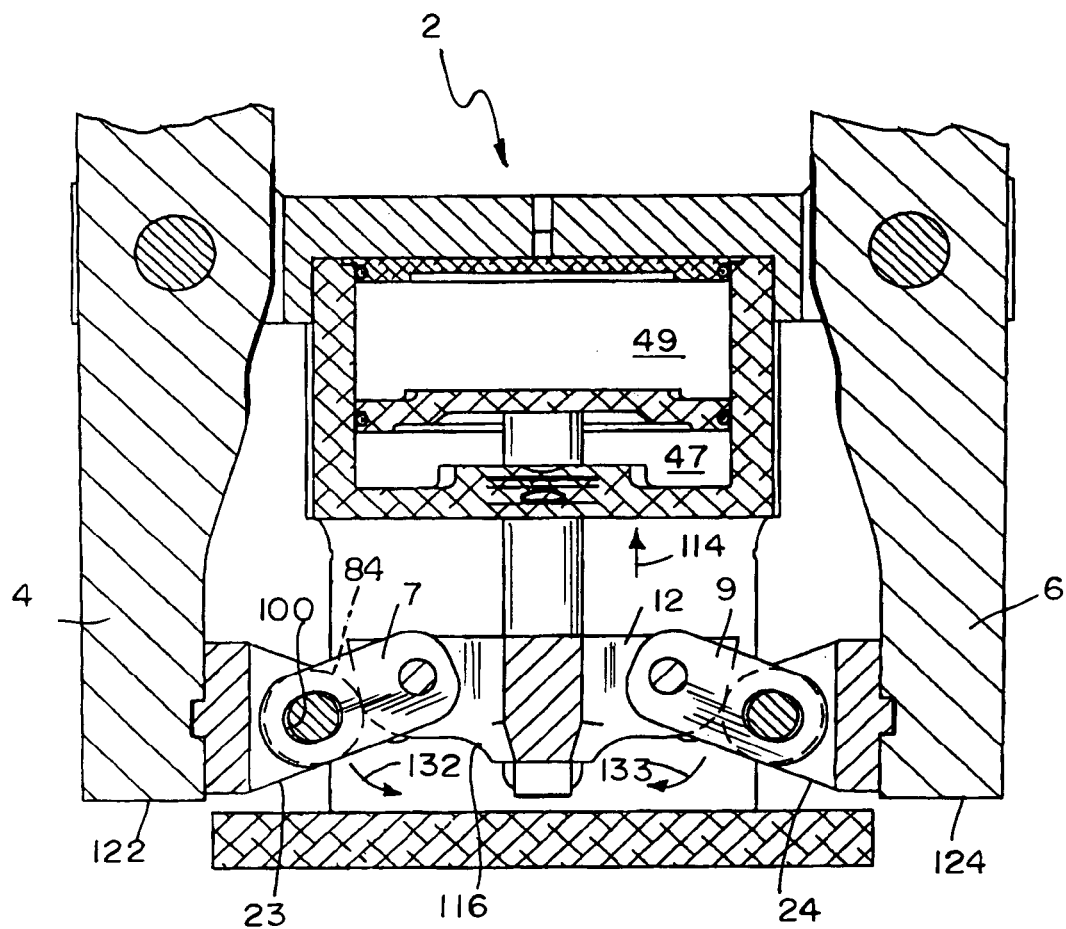
FIG. 10 is a cross-sectional view of the powered clamp assembly of FIG. 4, showing a linkage between the cam member and the jaw arm.

The cross-sectional view of powered clamp assembly 2 shown in FIG. 10 further demonstrates the movement of the links during retraction of the cam member 12 in direction 114. Movement of cam member 12 in direction 114 draws on links 7 and 9, for example, causing them to move inwardly in directions 132 and 133, respectively. This movement reduces the distance between proximal ends 122 and 124 of jaw arms 4 and 6. It is appreciated that the camming surfaces 116 and 118 are not required to drive jaw arms 4 and 6 during this retraction process.

Although the present disclosure has been described with reference to particular means, materials and embodiments, from the foregoing description, one skilled in the art can easily ascertain the essential characteristics of the present disclosure and various changes and modifications may be made to adapt the various uses and characteristics without departing from the spirit and scope of the present invention as set forth in the following claims.

What is claimed is:
1. A powered clamp assembly comprising:
   an actuator;
   a cam member having a camming surface;
   wherein the cam member is attached to and driven by the actuator;

at least one jaw arm pivotable about an axis;
a bearing member attached to the jaw arm;
wherein the bearing member is engagable with the camming surface of the cam member; and
wherein movement of the cam member causes the camming surface to move the bearing member which causes the jaw arm to pivot.

2. The powered clamp assembly of claim 1, wherein the cam member is movable linearly, and the camming surface is arcuate to cause the jaw arm to pivot.

3. The powered clamp assembly of claim 1, further comprising a link that movably couples the jaw arm to the cam member.

4. The powered clamp assembly of claim 3, wherein the cam member is movable in first and second directions, and wherein the camming surface of the cam member moves the jaw arm in a third direction when the cam member is moved in a first direction; and wherein the link moves the jaw arm in a fourth direction when the cam member is moved in the first direction.

5. The powered clamp assembly of claim 4, wherein the link comprising a slot, and the jaw arm comprising a pin extending therefrom that is disposed in the slot to prevent interference between the link and the cam member when the cam member is moved in the first direction and to provide engagement between the link and the cam member when the cam member is moved in the second direction.

6. The powered clamp assembly of claim 1, wherein the actuator is a pneumatic actuator.

7. The powered clamp assembly of claim 1, wherein the camming surface of the cam member is located on the periphery thereof.

8. The powered clamp assembly of claim 1, wherein the cam member is movable in first and second linearly reciprocal directions, and wherein the bearing member is a bushing that follows an arcuate cam path that displaces the bushing to cause the attached jaw arm to pivot.

9. A powered clamp assembly comprising:
a body;
an actuator;
a cam member having first and second camming surfaces;
wherein the cam member is driven by the actuator;
a first jaw arm pivotally mounted with respect to the body;
a second jaw arm pivotally mounted with respect to the body, and positioned opposite the first jaw arm;
a first bearing member attached to the first jaw arm and engagable with the first camming surface of the cam member; and
a second bearing member attached to the second jaw arm and engagable with the second camming surface of the cam member;
wherein movement of the cam member causes the first and second camming surfaces to engage the first and second bearing members, respectively, to cause the first and second bearing members to move to cause the first and second jaw arms to move.

10. The powered clamp assembly of claim 9, wherein the cam member is movable linearly, and the first and second jaw arms are movable pivotally.

11. The powered clamp assembly of claim 9, further comprising a first link that movably couples the first jaw arm to the cam member, and a second link that movably couples the second jaw arm to the cam member.

12. The powered clamp assembly of claim 11, wherein the cam member is movable in a first direction, and wherein the first and second camming surfaces of the cam members engage and separate the first and second bearing members, respectively, to move the first and second jaw arms, respectively, to a closed position.

13. The powered clamp assembly of claim 12, wherein when the cam member is movable in a second direction, and wherein the first and second links move the first and second jaw arms to an open position.

14. The powered clamp assembly of claim 13, wherein the first and second links each comprise a slot, and the first and second jaw arms each comprise a pin extending therefrom, respectively, wherein the pin extending from the first jaw arm is disposed in the slot of the first link, and wherein the pin extending from the second jaw arm is disposed in the slot of the second link, so as to prevent interference between the first and second links and the cam member when the cam member is moved in the first direction, and to provide engagement between the first and second links and the cam member when the cam member is moved in the second direction.

15. The powered clamp assembly of claim 9, wherein the actuator is a pneumatic actuator.

16. The powered clamp assembly of claim 9, wherein the first and second camming surfaces of the cam member are located on the periphery thereof.

17. The powered clamp assembly of claim 9, wherein the first and second bearing members are first and second bushings, respectively, each following arcuate cam paths of the first and second camming surfaces, respectively, such that the first and second bushings are displaced to cause the first and second jaw arms to pivot.

18. The powered clamp assembly of claim 9, wherein the cam member serves as a wedge between the first and second bearing members, moving the same apart and preventing a change in position until the cam member is moved.

19. A powered clamp assembly comprising:
an actuator;
a cam member having a camming surface which forms a pathway along at least a portion of the outer periphery of the cam member;
wherein the cam member is driven by the actuator in first and second directions;
a link movably coupled to the cam member;
a jaw arm; and
a bearing member coupled to the jaw arm;
wherein the link is movably coupled to the jaw arm; and
wherein during movement of the cam member in the first direction, the camming surface engages the bearing member and moves it along the pathway which causes the jaw arm to move.

20. The powered clamp assembly of claim 19, wherein during movement of the cam member in the second direction, the link engages the pin to move the jaw arm.

21. The powered clamp assembly of claim 19, wherein engagement of the bearing member by the cam member to move the arm only occurs during movement of the cam member in the first direction.

22. A powered clamp assembly having at least two jaw arms, with at least one of which being pivotable with respect to the other at a pivot point, and an actuator having a rod extending therefrom which is movable rectilinearly, the powered clamp assembly further comprising:
a wedge that is coupled to the rod for rectilinear movement;
a bushing coupled to the at least one jaw arm
wherein the wedge engages the bushing on the at least one jaw arm at a location spaced apart from the pivot point to move the at least one of the jaw arms about the pivot point.

* * * * *